UNITED STATES PATENT OFFICE 2,402,674

VACUUM DEHYDRATION OF PORK

Robert M. Schaffner, Chicago, Ill., assignor to The Guardite Corporation, a corporation of Illinois No Drawing. Application June 19, 1944, Serial No. 541,121

2 Claims. (Cl. 99—208)

This invention relates to the vacuum dehydration of pork and more particularly to a method of precooking the pork so as to retain the thiamin content of the pork. The absence of air during dehydration is also of importance in retaining the color and the flavor of the natural pork.

In preparing the pork for drying, the size of the particles of the meat is important. It has been found that particles approximately ⅜ inch in diameter, produced by grinding through a ⅜ inch opening, are very satisfactory. The raw pork is trimmed to remove blood clots, gristle, bone, etc., and is then ground. The ground material is then placed in steam heated kettles which are mechanically agitated. The amount of agitation is of importance, as is the direction and character of the agitation, so that a very small temperature differential is maintained at all times in the cooker. For example, when cooking a bulk mass containing approximately 1200 pounds of pork, during which time the pork was cooked at the maximum temperature not higher than 170° F., the minimum temperature in the kettle was only 10 degrees below the maximum temperature. Under these conditions the dried pork had a thiamin content of 0.85 milligram per 100 grams of pork (on a dry basis). On the other hand, the same quantity of similar pork similarly dried but cooked under conditions where the temperature varied as much as 30° F. within the kettle, had a thiamin content of only 0.54 milligram.

It is preferred to maintain a temperature between 165° F. and 170° F. throughout the kettle.

After cooking at this temperature range for a period of 30 to 60 minutes, the meat is drained to remove excess juice and fat and is then reground through the usual type of meat grinder, using a hole having a size of ⅛ to ⅜ inch.

The meat is then spread on trays having approximately 5 square feet of screened surface at loading densities of 0.8 to 2 lbs. per square foot.

The trays are then transported to a vacuum chamber which is evacuated to remove substantially all air. Steam is admitted to bring the resulting temperature in the chamber to 160–170° F. The pork may be preheated at this temperature for ½ to 10 minutes, but 2 minutes has been found to be particularly satisfactory.

The vacuum chamber is then evacuated to produce an absolute pressure of about ½ inch, which cools the pork correspondingly. The trays are then transferred under vacuum to a vacuum dehydration chamber where they are exposed to radiant heat surfaces approximately 3 inches from the surface of the pork, above and below the screen, and maintained at temperatures from 160° to 350° F. The temperatures employed depend upon the time desired for drying, the final moisture content desired, and the tray loading densities.

Superheated steam is introduced in substantial quantity at the entrance end of the vacuum chamber and at the exit end thereof, and is withdrawn near the center of the chamber. A device suitable for such operations is described more fully in co-pending Heineman application, Serial No. 520,773, filed February 2, 1944, and Baer application, Serial No. 524,177, filed February 28, 1944.

As pointed out in my co-pending application, Serial No. 538,198, filed May 31, 1944, the top levels of the dryer produced more rapid drying and this is counteracted by loading the top level trays about 0.2 lb. per square foot more heavily than the others.

The following table shows specific examples of drying data, in all of which a pressure of approximately 2¼ inches was maintained within the drying chamber. In each case the trays are passed progressively through the chamber and different temperatures were accomplished by different heating of progressive banks of heating coils.

*Specific examples of drying data*

| Drying time, min. | Drying cycles | | | | | | | Tray loadings, lbs./sq. ft. | | Average moisture contents, wt. percent |
|---|---|---|---|---|---|---|---|---|---|---|
| | | | | | | | | For top level trays | For other level trays | |
| | Minutes of exposure | | 16.7 | 16.7 | 8.3 | 16.6 | 16.7 | | | |
| 75 min. cycles | Radiant heat surface temperatures, ° F | | 344 | 338 | 307 | 274 | 240 | 1.2 | 1.0 | 2.6–3.5 |
| | | | 344 | 331 | 307 | 274 | 240 | 1.2 | 1.0 | 3.9 |
| | | | 344 | 331 | 298 | 274 | 240 | 1.2 | 1.0 | 4.8 |
| | | | 344 | 338 | 331 | 298 | 240 | 1.3 | 1.1 | 4.4 |
| | | | 344 | 338 | 312 | 274 | 240 | 1.3 | 1.1 | 5.8 |
| | | | 338 | 331 | 298 | 274 | 240 | 1.4 | 1.2 | 7.6 |
| | Minutes of exposure | | 20 | 20 | 10 | 20 | 20 | | | |
| 90 min. cycles | Radiant heat surface temperatures, ° F | | 338 | 316 | 274 | 240 | 228 | 1.4 | 1.2 | 5.5 |
| | | | 331 | 316 | 298 | 274 | 193 | 1.4 | 1.2 | 4.6 |
| | | | 331 | 316 | 298 | 274 | 162 | 1.4 | 1.2 | 5.6–7.9 |
| | | | 331 | 316 | 298 | 259 | 193 | 1.4 | 1.2 | 4.9–5.5 |
| | | | 331 | 316 | 274 | 240 | 228 | 1.4 | 1.2 | 6.1 |
| | | | 344 | 344 | 331 | 298 | 240 | 1.6 | 1.4 | 5.3 |
| | | | 344 | 338 | 331 | 316 | 316 | 1.6 | 1.4 | 2.2–4.4 |
| | | | 344 | 338 | 331 | 298 | 240 | 1.6 | 1.4 | 6.1 |
| | | | 344 | 338 | 338 | 316 | 316 | 1.8 | 1.8 | 6.7 |

The drying cycle has been satisfactorily varied from 60 minutes up to 180 minutes. Pork having a moisture content of 10% is considered satisfactory and it may, in fact, contain a good deal more than this without spoiling. It has been found desirable to bring the pork to a moisture content below 10%, or below the specified limit, and then to reconstitute it with meat juices or fat, or a combination thereof, recovered from the cooker.

The foregoing detailed description has been given for clearness of understanding only, and no unnecessary limitations should be understood therefrom.

What I claim as new, and desire to secure by Letters Patent, is:

1. In the vacuum dehydration of pork, the steps of precooking the pork in the absence of added water under substantially uniform temperature conditions while maintaining the thiamin content thereof substantially unimpaired, draining excess juice and fat from the meat, subjecting the pork to a vacuum to remove substantially all air, replacing the air with an atmosphere of substantially saturated steam sufficient to increase the temperature of the pork to approximately 160–170° F. for a short time, reducing the pressure to approximately ½ inch absolute, and then introducing the pork without contact with air to an atmosphere of superheated steam under sub-atmospheric but increased pressure, wherein the product is subjected to intense radiant heat, and drying the product therein to a moisture content at which the product will keep, said radiant heat being maintained by surfaces heated to between 160° and 350° F. and arranged at approximately 3 inches from the product.

2. The method as set forth in claim 1, in which the pork is loaded at from 0.8 to 2 lbs. per square foot, and is in particles having no dimension substantially greater than ⅜ inch.

ROBERT M. SCHAFFNER.